United States Patent
Mayama et al.

(10) Patent No.: US 9,234,088 B2
(45) Date of Patent: Jan. 12, 2016

(54) NON-HALOGEN FLAME-RETARDANT RESIN COMPOSITION, AND INSULATED ELECTRIC WIRE AND TUBE USING THE SAME

(75) Inventors: Yuhei Mayama, Osaka (JP); Hiroshi Hayami, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 9 days.

(21) Appl. No.: 13/984,158

(22) PCT Filed: Mar. 8, 2012

(86) PCT No.: PCT/JP2012/055930
§ 371 (c)(1),
(2), (4) Date: Aug. 7, 2013

(87) PCT Pub. No.: WO2012/124589
PCT Pub. Date: Sep. 20, 2012

(65) Prior Publication Data
US 2013/0312998 A1    Nov. 28, 2013

(30) Foreign Application Priority Data
Mar. 17, 2011    (JP) .................................. 2011-059805

(51) Int. Cl.
| | | |
|---|---|---|
| H01B 7/295 | (2006.01) |
| C08K 5/3492 | (2006.01) |
| C08L 23/08 | (2006.01) |
| C08K 3/32 | (2006.01) |
| H01B 3/44 | (2006.01) |
| H01B 3/28 | (2006.01) |

(52) U.S. Cl.
CPC .............. *C08K 5/34924* (2013.01); *C08K 3/32* (2013.01); *C08L 23/0815* (2013.01); *C08L 23/0846* (2013.01); *C08L 23/0853* (2013.01); *C08L 23/0869* (2013.01); *H01B 3/441* (2013.01); *H01B 3/442* (2013.01); *H01B 7/295* (2013.01); *C08L 2201/02* (2013.01); *C08L 2203/202* (2013.01); *H01B 3/28* (2013.01); *Y10T 428/139* (2015.01); *Y10T 428/1331* (2015.01); *Y10T 428/2933* (2015.01)

(58) Field of Classification Search
USPC ..................................................... 174/121 A
See application file for complete search history.

(56) References Cited

U.S. PATENT DOCUMENTS

| | | | |
|---|---|---|---|
| 6,255,371 B1 * | 7/2001 | Schlosser et al. ............. | 524/100 |
| 6,365,071 B1 * | 4/2002 | Jenewein et al. ............. | 252/609 |
| 2002/0112875 A1 * | 8/2002 | Hase et al. ................ | 174/120 C |
| 2010/0212930 A1 * | 8/2010 | Yasumoto et al. ...... | 174/110 SR |
| 2010/0307822 A1 * | 12/2010 | Schmidt ..................... | 174/74 R |
| 2011/0180301 A1 * | 7/2011 | Basfar et al. ............ | 174/110 SR |
| 2013/0123398 A1 * | 5/2013 | Roos et al. .................... | 524/100 |

FOREIGN PATENT DOCUMENTS

| | | |
|---|---|---|
| CN | 101835832 A | 9/2010 |
| CN | 102171276 A | 8/2011 |
| CN | 102575106 A | 7/2012 |
| JP | 05-081930 A | 4/1993 |
| JP | 06-336536 A | 12/1994 |
| JP | 10-168248 A | 6/1998 |
| JP | 2003-151376 A | 5/2003 |
| JP | 2004-352889 A | 12/2004 |
| JP | 2005-200574 A | 7/2005 |
| JP | 2007-197489 A | 8/2007 |
| JP | 2007-246726 A | 9/2007 |
| JP | 2007-277530 A | 10/2007 |
| JP | 2008-239901 A | 10/2008 |
| JP | 2009-249552 A | 10/2009 |
| JP | 2010-118207 A | 5/2010 |
| JP | 2011-099084 A | 5/2011 |
| JP | 2011-100708 A | 5/2011 |
| WO | 2007-010318 A1 | 1/2007 |
| WO | 2009047353 A1 | 4/2009 |

OTHER PUBLICATIONS

Notification of the First Office Action dated Feb. 3, 2015 from the Chinese Patent Office to the corresponding Chinese Patent Application No. 201280013094.5.
Notification of Reasons for Rejection from the JPO dated May 15, 2015 for the corresponding Japanese Patent Application No. 2013-504684.

* cited by examiner

*Primary Examiner* — Chau N Nguyen
(74) *Attorney, Agent, or Firm* — Global IP Counselors, LLP

(57) ABSTRACT

Provided are a non-halogen flame-retardant resin composition that contains a base polymer mainly containing a polyolefin-based resin, that passes a flame test, and that has good heat resistance and good heat-aging resistance which can satisfy a 150° C. rating, and an insulated electric wire and a tube using the non-halogen flame-retardant resin composition. The non-halogen flame-retardant resin composition contains (A) a base polymer containing 90% by mass or more of a mixture of a polyolefin-based resin and a styrene-based elastomer; (B) a metal phosphinate; and (C) a nitrogen-based flame retardant, and is used as an insulating coating layer. The insulating coating layer and the tube are preferably cross-linked by irradiation with ionizing radiation.

13 Claims, No Drawings

NON-HALOGEN FLAME-RETARDANT RESIN COMPOSITION, AND INSULATED ELECTRIC WIRE AND TUBE USING THE SAME

CROSS-REFERENCE TO RELATED APPLICATIONS

This U.S. National stage application claims priority under 35 U.S.C. §119(a) to Japanese Patent Application No. 2011-059805, filed in Japan on Mar. 17, 2011, the entire contents of which are hereby incorporated herein by reference.

TECHNICAL FIELD

The present invention relates to a non-halogen flame-retardant resin composition for providing an insulating coating that satisfies a 150° C. rating specified in UL standards, and an insulated electric wire and a tube using the resin composition.

BACKGROUND ART

Insulating coatings and tubes of insulated electric wires and insulated cables that are used in wiring arranged inside electronic equipment and automobiles require high flame retardancy, high tensile properties, and a property that good tensile properties can be maintained even after exposure to high temperatures (heat resistance and heat-aging resistance).

In general, UL (Underwriters Laboratories Inc.) standards are used for evaluating the flame retardancy, heat resistance, and heat-aging resistance of electric wires. Regarding the flame retardancy, it is necessary to satisfy the Vertical-Specimen-Flame test (VW-1). Regarding heat resistance and heat-aging resistance, in UL standards, the heat resistance and heat-aging resistance are determined in terms of tensile strength retention and elongation retention after a heat-aging test. The heat-aging test is performed as follows. For example, in the case of a 150° C. rating, the test is performed in a Geer oven at 180° C. for seven days. In the case of a 125° C. rating, the test is performed in a Geer oven at 158° C. for seven days. In the case of a 105° C. rating, the test is performed in a Geer oven at 136° C. for seven days. In the 150° C. rating specified in UL 1581, the following characteristics are required: Regarding initial tensile properties, the elongation is 300% or more and the tensile strength is 13.79 MPa or more. In addition, even after the heat-aging test in a Geer oven at 180° C. for seven days, the tensile strength retention and the elongation retention are each 80% or more.

Hitherto, soft polyvinyl chloride compositions and halogen-based flame-retardant resin compositions prepared by incorporating a bromine-based or chlorine-based flame retardant in a polyolefin-based resin such as polyethylene, an ethylene-ethyl acrylate copolymer, or an ethylene-vinyl acetate copolymer have been used as materials that satisfy the above mechanical/physical properties and flame retardancy.

For example, Japanese Unexamined Patent Application Publication No. 5-81930 (PTL 1) discloses a resin composition containing, as a base polymer, a mixture of polyethylene having a melting point of 125° C. or higher and an ethylene-α-olefin copolymer and, as flame retardants, a metal hydroxide, a halogen-based flame retardant, and an organosilicon compound such as methacryloxypropyltrimethoxysilane. It is disclosed that an insulating coating layer produced by cross-linking a coating layer composed of this resin composition satisfies the flame retardancy specified by the Vertical-Specimen-Flame test and the requirements for the 125° C. rating (after the heat-aging test in a Geer oven at 158° C. for seven days) specified in UL standards.

Japanese Patent No. 3279206 (Japanese Unexamined Patent Application Publication No. 10-168248: PTL 2) discloses that a cross-linked insulating coating using a flame-retardant resin composition prepared by incorporating a halogen-based flame retardant and flowers of zinc (zinc oxide) in a polyolefin-based resin which is an ethylene-α-olefin copolymer and which has a density of less than 0.89 satisfies the 150° C. rating.

As described above, it is known that, in the case where a halogen-based flame retardant is used, a cross-linked insulating coating containing a polyolefin-based resin as a main component can satisfy the requirements for the 125° C. rating, and furthermore, the requirements for the 150° C. rating.

However, electric wires and cables produced by using any of these flame-retardant resin compositions cause a problem in that a hydrogen halide gas is generated during an incineration treatment. Therefore, recently, so-called non-halogen flame-retardant resin compositions, which contain no halogen-based flame retardant, have been desired.

Typical examples of non-halogen flame retardants include metal hydroxides such as aluminum hydroxide and magnesium hydroxide. However, in order to pass the Vertical-Specimen-Flame test VW-1 specified in UL standards using a metal hydroxide-based flame retardant, it is necessary to add the metal hydroxide-based flame retardant in a large amount. The addition of the metal hydroxide-based flame retardant in such an amount that the flame test can be passed causes a problem of a significant decrease in the tensile strength and the elongation.

Besides metal hydroxides, organic phosphorus-based flame retardants such as phosphoric acid esters, and nitrogen-based flame retardants are known as the non-halogen flame retardants. However, the flame-retardant effect of these non-halogen flame retardants is not as high as that of halogen-based flame retardants. Accordingly, in reality, satisfactory flame retardancy is not obtained unless such a non-halogen flame retardant is added in a large amount, or the flame retardancy is not improved even if such a non-halogen flame retardant is added in a large amount.

In order to reduce the content of a flame retardant, non-halogen flame-retardant materials containing a flame-retardant resin as a base polymer have been developed.

For example, Japanese Unexamined Patent Application Publication No. 2009-249552 (PTL 3) discloses a cross-linked insulating coating produced by using a resin composition containing a mixture of a polyphenylene ether-based resin and a styrene-based elastomer as a base polymer, a phosphorus-based flame retardant, a nitrogen-based flame retardant, and a multifunctional monomer. In this resin composition, an ester or ammonium salt of condensed phosphoric acid is used as the phosphorus-based flame retardant.

In the resin composition disclosed in PTL 3, a flame-retardant polyphenylene ether-based resin is used instead of a polyolefin-based resin. Therefore, even when the content of the flame retardant is reduced, the resin composition can pass the flame test and satisfy the requirements of the mechanical strength (tensile properties) at room temperature. However, regarding a heat-aging test, an insulating coating merely satisfies a retention of 75% or more after being left to stand at 136° C. for seven days. Thus, the insulating coating cannot be used as an electric wire that satisfies the 150° C. rating.

Japanese Unexamined Patent Application Publication No. 2010-118207 (PTL 4) discloses a cross-linked insulated electric wire including an insulating coating having a two-layer structure. The cross-linked insulated electric wire includes a conductor, a first insulating layer (inner layer) formed on the conductor, and a second insulating layer (outer layer) formed on the first insulating layer. The first insulating layer is composed of a resin composition containing, as a base polymer, a resin prepared by mixing a styrene-based elastomer, a polyolefin-based resin, and a polyphenylene ether-based resin, and, as flame retardants, a phosphorus-based flame retardant (a condensed phosphoric acid ester such as triphenyl phosphate) and a nitrogen-based flame retardant. The second insulting layer is composed of a resin composition containing a metal hydroxide as a flame retardant.

Examples of PTL 4 disclose an insulated electric wire including an inner layer composed of a cross-linked product of a resin composition containing, as a base polymer, a polyphenylene ether-based resin and a styrene-based elastomer, and a condensed phosphoric acid ester and melamine cyanurate, and an outer layer composed of a cross-linked product of a resin composition prepared by adding 180% by mass of magnesium hydroxide to a base polymer. Regarding heat-aging resistance of this insulated electric wire, although the 125° C. rating (heat-aging test at 158° C. for seven days) is satisfied, in the 150° C. rating (heat-aging test at 180° C. for seven days), the retention is about 20% to 30%. Thus, the insulated electric wire cannot be used in applications of the 150° C. rating.

PTL 1: Japanese Unexamined Patent Application Publication No. 5-81930
PTL 2: Japanese Unexamined Patent Application Publication No. 10-168248
PTL 3: Japanese Unexamined Patent Application Publication No. 2009-249552
PTL 4: Japanese Unexamined Patent Application Publication No. 2010-118207

DISCLOSURE OF INVENTION

Technical Problem

As described above, in the case where a halogen-based flame retardant is used, an insulated electric wire that includes an insulating coating containing a polyolefin-based resin as a base polymer and that satisfies the requirements of the 150° C. rating exists. However, an insulated electric wire that includes an insulating coating composed of a non-halogen resin composition and that can satisfy the requirements of the 150° C. rating has not existed to date.

The present invention has been made in view of the above circumstances, and an object of the present invention is to provide a non-halogen flame-retardant resin composition that contains a base polymer mainly containing a polyolefin-based resin, that passes a flame test, and that has good heat resistance and good heat-aging resistance which can satisfy the 150° C. rating, and an insulated electric wire and a tube using the non-halogen flame-retardant resin composition.

Solution to Problem

A non-halogen flame-retardant resin composition of the present invention contains (A) a base polymer containing 90% by mass or more of a mixture of a polyolefin-based resin and a styrene-based elastomer; (B) a metal phosphinate; and (C) a nitrogen-based flame retardant.

A mass ratio of the content of the polyolefin-based resin to the content of the styrene-based elastomer (polyolefin-based resin: styrene-based elastomer) is preferably 90:10 to 50:50.

In addition, 10 to 50 parts by mass of the metal phosphinate and 10 to 50 parts by mass of the nitrogen-based flame retardant are preferably contained relative to 100 parts by mass of the base polymer. More preferably, 10 to 40 parts by mass of the metal phosphinate and 10 to 40 parts by mass of the nitrogen-based flame retardant are contained.

The styrene-based elastomer is a block copolymer of styrene and a rubber component, and the content of the styrene component is preferably 10% to 70% by mass. The polyolefin-based resin preferably has an ethylene content of 50% by mass or more.

Furthermore, the polyolefin-based resin is preferably at least one selected from the group consisting of ethylene-ethyl acrylate copolymers, ethylene-methyl acrylate copolymers, ethylene-vinyl acetate copolymers, ethylene-butene copolymers, ethylene-octene copolymers, and very low-density polyethylenes.

The metal phosphinate is preferably aluminum hypophosphite. The nitrogen-based flame retardant is preferably melamine cyanurate.

The non-halogen flame-retardant resin composition of the present invention may further contain a multifunctional monomer.

The present invention also covers an insulated electric wire including a conductor and a coating layer that covers the conductor, in which the coating layer is composed of the non-halogen flame-retardant resin composition of the present invention, and a tube produced by forming the non-halogen flame-retardant resin composition of the present invention into a tube. The coating layer is preferably cross-linked by irradiation with ionizing radiation. The tube may be a heat-shrinkable tube produced by cross-linking the tube of the present invention by irradiation with ionizing radiation, increasing the diameter of the tube under heating, and subsequently conducting cooling to fix the shape of the tube.

In the insulated electric wire, the conductor preferably has an outer diameter of 0.1 mm or more and 0.8 mm or less, and the coating layer preferably has a thickness of 0.1 mm or more and 1 mm or less.

An insulated electric wire according to another aspect of the present invention is an insulated electric wire including a conductor and a coating layer that covers the conductor. The coating layer is formed by cross-linking a non-halogen flame-retardant resin composition by irradiation with ionizing radiation, the non-halogen flame-retardant resin composition containing a base polymer containing 50% by mass or more of a polyolefin-based resin, a metal phosphinate, and a nitrogen-based flame retardant. The coating layer has an initial tensile strength of 13.8 MPa or more, an initial tensile elongation of 300% or more, a retention of each of the tensile strength and the tensile elongation of 80% or more after being heat-aged at 180° C. for seven days, and passes a Vertical-Specimen-Flame test (VW-1) specified in UL standards.

Advantageous Effects of Invention

An insulating coating produced by using the non-halogen flame-retardant resin composition of the present invention contains a polyolefin-based resin as a base polymer, and a non-halogen-based flame retardant, and can satisfy the requirements of the 150° C. rating and the Vertical-Specimen-Flame test (VW-1) in the form of an insulated electric wire or a tube.

BEST MODES FOR CARRYING OUT THE INVENTION

Embodiments of the present invention will be described below. It is to be understood that the embodiments disclosed below are only illustrative in all points and not restrictive. It is intended that the scope of the present invention is defined by Claims and includes the equivalents of the description of Claims and all modifications within the scope of Claims.

<Non-Halogen Flame-Retardant Resin Composition>

A non-halogen flame-retardant resin composition of the present invention is a non-halogen flame-retardant resin composition containing a polyolefin-based resin as a main component. A coating layer of an insulated electric wire produced by coating a conductor with the composition and cross-linking the composition by irradiation with ionizing radiation has an initial tensile strength of 13.8 MPa or more, an initial tensile elongation of 300% or more, a retention of each of the tensile strength and the tensile elongation of 80% or more after being heat-aged at 180° C. for seven days, and passes the Vertical-Specimen-Flame test (VW-1) specified in UL standards. Specifically, the resin composition contains a base polymer containing 90% by mass or more of a mixture of a polyolefin-based resin and a styrene-based elastomer, and a metal phosphinate and a nitrogen-based flame retardant as flame retardants. Respective components will now be sequentially described.

(A) Base Polymer (A-1) Polyolefin-Based Resin

Examples of a polyolefin-based resin used in the present invention include polypropylenes (homopolymer, block polymers, and random polymers); polypropylene-based thermoplastic elastomers; reactor-type polypropylene-based thermoplastic elastomers; dynamically cross-linked polypropylene-based thermoplastic elastomers; polyethylene-based resins such as polyethylenes (high-density polyethylenes, linear low-density polyethylenes, low-density polyethylenes, and very low-density polyethylenes), ethylene-vinyl acetate copolymers, ethylene-ethyl acrylate copolymers, ethylene-methyl methacrylate copolymers, ethylene-methyl acrylate copolymers, ethylene-butyl acrylate copolymers, ethylene-propylene rubbers, ethylene-acrylic rubbers, ethylene-glycidyl methacrylate copolymers, and ethylene-methacrylic acid copolymers; and ionomer resins in which ethylene-methacrylic acid copolymer molecules or ethylene-acrylic acid copolymer molecules are bonded to each other with a metal ion, such as a sodium ion or a zinc ion, therebetween. Examples of the polyolefin-based resin further include any of the above resins modified with maleic anhydride or the like, and any of the above resins having an epoxy group, an amino group, or an imide group.

Among the above polyolefin-based resins, polyethylene-based resins having an ethylene content of 50% by mass or more are preferable, polyethylene-based resins having an ethylene content of 60% to 90% by mass are more preferable, and polyethylene-based resins having an ethylene content of 60% to 85% by mass are still more preferable.

Specifically, ethylene-meth(acrylate) copolymers such as ethylene-ethyl acrylate copolymers (EEA) and ethylene-methyl acrylate copolymers (EMA); ethylene-vinyl acetate copolymers (EVA); copolymers of ethylene and an olefin having 4 to 8 carbon atoms, such as ethylene-octene copolymers and ethylene-butene copolymers; and very low-density polyethylenes are preferably used. More preferably, EEA having an ethyl acrylate content of 10% to 40% by mass and EVA having a vinyl acetate content of 10% to 40% by mass are used.

The above polyolefin-based resins are contained in the base polymer preferably in an amount of 50% by mass or more, and more preferably in an amount of 60% by mass or more.

(A-2) Styrene-Based Elastomer

A styrene-based elastomer used in the present invention is a block copolymer of a polystyrene block and a rubber component block such as polybutadiene. For example, di-block copolymers, tri-block copolymers, radial teleblock copolymers, multiblock copolymers, and tapered block copolymers of a rubber component block such as polybutadiene or polyisoprene and a polystyrene block can be used. Furthermore, hydrogenated polymers, partially hydrogenated polymers, maleic anhydride-modified elastomers, epoxy-modified elastomers etc. of any of the above copolymers may be used. Specific examples thereof include styrene/butadiene/styrene copolymers (SBS), styrene/isoprene/styrene copolymers (SIS), styrene/isobutylene/styrene copolymers (SIBS), styrene/ethylene-propylene/styrene copolymers (SEPS), styrene/ethylene/ethylene-propylene/styrene copolymers (SEEPS), styrene/ethylene-butylene/styrene copolymers (SEBS), styrene/ethylene-butylene/ethylene copolymers (SEBC), styrene/ethylene-propylene copolymers (SEP), styrene/isoprene copolymers, styrene/ethylene/isoprene copolymers, and styrene/butadiene copolymers.

These styrene-based elastomers are useful for improving the tensile elongation and the tensile strength. The styrene content in the styrene-based elastomer is preferably 10% to 70% by mass, and more preferably 15% to 50% by mass from the standpoint of the tensile elongation, the tensile strength, and compatibility with the polyolefin-based resin.

In the base polymer, the mixing mass ratio of the polyolefin-based resin to the styrene-based elastomer is preferably polyolefin-based resin:styrene-based elastomer=90:10 to 50:50, and more preferably 90:10 to 60:40.

(A-3) Other Thermoplastic Resins

The base polymer of the non-halogen flame-retardant resin composition of the present invention may contain, besides the polyolefin-based resin and the styrene-based elastomer, other thermoplastic resins as long as the advantages of the present invention are not impaired (usually in an amount of 10% by mass or less). Examples of the other thermoplastic resins include other thermoplastic elastomers such as polyester thermoplastic elastomers and polyurethane thermoplastic elastomers; styrene-based resins such as high-impact polystyrene, acrylonitrile-styrene resins, and acrylonitrile-butadiene-styrene (ABS) resins; rubbers such as ethylene propylene diene monomer rubbers (EPDM), ethylene acrylic rubbers, acrylic rubbers, and nitrile rubbers; nylons; polybutylene terephthalate; polyethylene terephthalate; polyethylene naphthalate; and polyphenyl sulfide.

(B) Metal Phosphinate

A metal phosphinate is a compound represented by formula (I) below. In the formula, $R^1$ and $R^2$ are each hydrogen, an alkyl group having 1 to 8 carbon atoms, or an aryl group having 12 or less carbon atoms, and M is an alkali metal, an alkaline earth metal, a trivalent metal, a monovalent to trivalent transition metal, or ammonium, such as calcium, aluminum, zinc, magnesium, potassium, sodium, lithium, ammonium, barium, or strontium. Among these, organic metal phosphinates in which $R^1$ and $R^2$ are each an alkyl group having 1 to 8 carbon atoms or an aryl group having 12 or less carbon atoms are preferable. The metal is preferably calcium, aluminum, or zinc, and more preferably aluminum.

[Chem. 1]

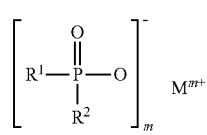
(I)

Metal phosphinates have a phosphorus content higher than that of other organophosphorus-based flame retardants. Specifically, the phosphorus content is preferably 15% by mass or more, more preferably 18% by mass or more, and still more preferably 20% by mass or more.

Commercially available metal phosphinates may be used. Specific examples of the commercially available products that can be used include, aluminum salts of organic phosphinic acid such as EXOLIT OP1230, EXOLIT OP1240, EXOLIT OP930, and EXOLIT OP935, and blended products of an aluminum salt of organic phosphinic acid and melamine polyphosphate, such as EXOLIT OP1312, all of which are manufactured by Clariant K.K.

The content of the metal phosphinate is preferably 10 to 50 parts by mass, more preferably 10 to 45 parts by mass, and still more preferably 20 to 40 parts by mass relative to 100 parts by mass of the base polymer. When the content of the metal phosphinate is less than 10 parts by mass, it is difficult to ensure the flame retardancy. When the content of the metal phosphinate exceeds 50 parts by mass, mechanical properties cannot be satisfied.

(C) Nitrogen-Based Flame Retardant

A nitrogen-based flame retardant is incorporated as a flame retardant together with the metal phosphinate.

As the nitrogen-based flame retardant, derivatives and adducts of cyanuric acid, melamine, triazine, guanidine, or the like are preferably used. Specific examples of the nitrogen-based flame retardant that can be used include melamine resins, melamine cyanurate, isocyanuric acid, isocyanurate derivatives, and adducts of any of these. Among these, melamine and melamine cyanurate, which have an amino group and/or imide unit in its molecule, are preferably used.

The use of such a nitrogen-based flame retardant in combination with the metal phosphinate can ensure the flame retardancy at a level at which the VW-1 test specified in UL standards may be passed without a significant decrease in tensile properties, though the mechanism is not clear.

The nitrogen-based flame retardant may be subjected to a surface treatment with a silane coupling agent such as an aminosilane coupling agent, a vinylsilane coupling agent, an epoxysilane coupling agent, or a methacryloxysilane coupling agent; or a higher fatty acid such as stearic acid or oleic acid. The surface treatment may be performed in advance before the nitrogen-based flame retardant is mixed with other components. Alternatively, the surface treatment may be performed by blending the nitrogen-based flame retardant with a surface treatment agent during blending and mixing with other components.

The content of the nitrogen-based flame retardant is preferably 10 to 50 parts by mass, more preferably 10 to 45 parts by mass, and still more preferably 20 to 40 parts by mass relative to 100 parts by mass of the base polymer. When the content of the nitrogen-based flame retardant is less than 10 parts by mass, the flame-retardant effect due to the use in combination with the metal phosphinate is not obtained. When the content of the nitrogen-based flame retardant exceeds 50 parts by mass, the tensile elongation decreases and the initial tensile properties cannot also be ensured.

The total content of the metal phosphinate and the nitrogen-based flame retardant is preferably 40 to 100 parts by mass, and more preferably 50 to 80 parts by mass relative to 100 parts by mass of the base polymer. A mass ratio of the content of the metal phosphinate to the content of the nitrogen-based flame retardant (metal phosphinate:nitrogen-based flame retardant) is preferably 3:1 to 1:2, and more preferably 2.5:1 to 1:1.5.

(D) Multifunctional Monomer

In the case where a polyolefin-based resin is used as a main component of the base polymer, it is necessary that the base polymer be moderately cross-linked in order that the resulting insulating coating satisfies heat resistance and flame retardancy (VW-1 test). Accordingly, in order to improve a cross-linking property, the non-halogen flame-retardant resin composition further preferably contains a multifunctional monomer.

As the multifunctional monomer, monomers having a plurality of carbon-carbon double bonds in their molecules, such as monoacrylates, diacrylates, triacrylates, monomethacrylates, dimethacrylates, trimethacrylates, triallyl isocyanurate, and triallyl cyanurate are preferably used. From the standpoint of a cross-linking property, trimethacrylate monomers such as trimethylolpropane trimethacrylate are preferably used. Such a multifunctional monomer can form a bond with the base polymer by irradiation with ionizing radiation and contributes to the formation of a three-dimensional network structure of an insulating coating. Thus, the multifunctional monomer can be useful for improving the physical properties at high temperatures.

The multifunctional monomer is contained in an amount of 1 to 20 parts by mass relative to 100 parts by mass of the base polymer. When the content of the multifunctional monomer is less than 1 part by mass, the cross-linking effect is not obtained, a decrease in the tensile properties at high temperatures becomes significant, and thermal deformation at high temperatures is also significant. On the other hand, when the content of the multifunctional monomer exceeds 20 parts by mass, unreacted monomer may remain, which may cause a decrease in flame retardancy.

(E) Other Components

The non-halogen flame-retardant resin composition of the present invention may contain various additives such as other non-halogen-based flame-retardants, an antioxidant, a lubricant, a processing stabilizing auxiliary agent, a coloring agent, a foaming agent, a reinforcing agent, a filler, a vulcanizing agent, a metal deactivator, and a silane coupling agent as long as the flame retardancy, thermal deformation resistance, and tensile properties are not impaired.

Examples of the other flame-retardants that can be used include metal hydroxides such as aluminum hydroxide, magnesium hydroxide, and calcium hydroxide; other phosphorus-based flame retardants such as phosphoric acid esters, melamine phosphate compounds, ammonium phosphate compounds, and polyphosphazene compounds; antimony trioxide; zinc stannate; zinc hydroxystannate; zinc borate; and boron phosphate.

[Preparation of Resin Composition]

The flame-retardant resin composition of the present invention is prepared by blending predetermined amounts of the above-described components, and mixing the components using a known melting mixer such as a single-screw extrusion mixer, a pressure kneading machine, or a Banbury mixer.

<Electric Wire>

An insulated electric wire of the present invention includes a conductor and a coating layer formed on the conductor, the coating layer being composed of the non-halogen flame-retardant resin composition of the present invention. The insulated electric wire of the present invention can be produced by forming the resin composition of the present invention on a conductor by extrusion molding with a melt extruder or the like.

As the conductor, for example, a copper wire, a copper alloy wire, or a wire, the surface of which is coated with silver, tin, or the like by plating, may be appropriately selected and used. The conductor may be a single wire or a strand wire including a plurality of wires.

The coating layer may include a single layer or two or more layers. The conductor may be coated with an underlayer, and the underlayer may then be coated with an insulating layer composed of the resin composition of the present invention.

In the insulated electric wire of the present invention, the coating layer is preferably cross-linked by irradiation with ionizing radiation. The mechanical strength, heat resistance, and thermal deformation resistance are improved by the cross-linking. The insulated electric wire including the cross-linked insulating coating of the present invention can satisfy the flame retardancy and mechanical properties of the 150° C. rating specified in UL 1581. Specifically, the insulated electric wire has an initial tensile strength of 13.8 MPa or more, an initial tensile elongation of 300% or more, and a retention of each of the tensile strength and the tensile elongation of 80% or more after being heat-aged at 180° C. for seven days, and passes the Vertical-Specimen-Flame test (VW-1) specified in UL standards.

Examples of the ionizing radiation used in the irradiation of ionizing radiation include electron beams such as accelerated electron beams, y rays, X rays, α rays, and ultraviolet rays. Accelerated electron beams can be most preferably used from the standpoint of the industrial use, for example, the simplicity of the use of the radiation source, the penetration thickness of the ionizing radiation, and the speed of the cross-linking process.

The accelerating voltage of an accelerated electron beam is appropriately determined in accordance with the coating thickness of the coating layer and the composition of the resin composition constituting the coating layer. For example, for a coating layer having a thickness of 0.4 to 0.6 mm, the accelerating voltage is selected from 300 keV to 3.0 MeV. The exposure dose is not particularly limited, but is usually 20 to 500 kGy.

In the insulated electric wire of the present invention, the thickness of the coating layer composed of the resin composition of the present invention is not particularly limited. For example, in the case where the outer diameter of the conductor is 0.1 mm or more and 0.8 mm or less, the thickness of the coating layer is preferably 0.1 to 1 mm.

<Tube and Heat-Shrinkable Tube>

A tube of the present invention is a tube produced by forming the above-described non-halogen flame-retardant resin composition into a tube by extrusion molding or the like. The type of extruder is not particularly limited. A screw-type extruder or a non-screw-type extruder may be used, but a screw-type extruder is preferable. The type of screw is also not particularly limited. However, a ratio (L/D) of the total length L to the diameter of the cylinder hole D is usually preferably about 15 to 40. The draw down ratio (DDR) is not particularly limited, but is preferably about 1 to 20. The temperature of a heater is a temperature at which the flame-retardant resin composition used as an extrusion material can be softened and melted, usually about 120° C. to 200° C., and more preferably about 160° C. to 180° C.

The tube and heat-shrinkable tube of the present invention are used as insulating coating materials or protective materials of an electric wire, a wire harness, a cable, or the like.

The heat-shrinkable tube of the present invention is produced by cross-linking the above-described tube by irradiation with ionizing radiation, then expanding the tube so as to have a predetermined outer diameter by, for example, introducing compressed air into the tube while heating the tube to a temperature equal to or higher than the softening point of the base polymer, and then cooling the tube to fix the shape.

The cross-linking by irradiation with ionizing radiation can be performed as in the cross-linking by irradiation with ionizing radiation performed on a coating layer of the insulated electric wire of the present invention. The expansion ratio is preferably about 1.2 to 5 times. The wall thickness of the tube-shaped molded body is not particularly limited, but is preferably 0.01 to 1.5 mm.

The heat-shrinkable tube of the present invention can pass the Vertical-Specimen-Flame test (VW-1) and can satisfy the mechanical properties corresponding to the 150° C. rating of an insulated electric wire. Specifically, the initial tensile strength is 10.4 MPa or more and the initial tensile elongation is 200% or more. After heat aging at 180° C. for seven days, the tensile strength is 7.3 MPa or more and the elongation is 100% or more.

Examples

The best modes for carrying out the present invention will be described by way of Examples. These Examples do not limit the scope of the present invention.

Note that, in Examples below, "part" means "part by mass" unless otherwise specified.

[Methods for Measurement and Evaluation]

First, methods for measurement and evaluation performed in Examples below will be described.

A: Before Cross-Linking (Before Irradiation with Ionizing Radiation)

(1) Secant Modulus

A conductor was drawn out from a prepared electric wire, and a tensile test was performed using the remaining coating layer before cross-linking at a tensile speed of 50 mm/min, with a distance between marked lines of 25 mm, and at a temperature of 23° C. A modulus of elasticity at a point at which the elongation was 2% was then calculated from a stress-elongation curve.

(2) Tensile Properties

A conductor was drawn out from a prepared electric wire, and a tensile test was performed using the remaining coating layer before cross-linking. Regarding the test conditions, the tensile speed was 500 mm/min, the distance between marked lines was 25 mm, and the temperature was 23° C. The tensile strength and the tensile elongation (breaking elongation) were each measured using three samples, and the averages thereof were determined.

A sample having a tensile strength of 10.3 MPa or more and a tensile elongation of 150% or more was evaluated as "acceptable".

B: After Cross-Linking (after Irradiation with Ionizing Radiation)

(1) Initial State

A conductor was drawn out from an electric wire after the electric wire had been irradiated with ionizing radiation. The secant modulus and the tensile properties were measured by the same methods as those used before cross-linking using the remaining cross-linked coating layer. A sample having a tensile strength of 13.8 MPa or more and a tensile elongation of 300% or more was evaluated as "acceptable".

(2) 125° C. Rating

A cross-linked coating layer prepared by the same method as that used in the initial state was left to stand in a Geer oven set at 160° C. for 168 hours (seven days), and a tensile test was then performed. The retentions relative to the initial tensile strength and the initial breaking elongation were determined. When the retentions were each 80% or more, the sample was acceptable.

(3) 150° C. Rating

A cross-linked insulating coating film prepared by the same method as that used in the initial state was left to stand in a Geer oven set at 180° C. for 168 hours (seven days), and a tensile test was then performed. The retentions relative to the initial tensile strength and the initial breaking elongation were determined. When the retentions were each 80% or more, the sample was acceptable.

(4) Flame Retardancy

The VW-1 Vertical-Specimen-Flame test described in UL standards 1581, section 1080 was conducted using five samples. In the test, a flame was applied to each sample for 15 seconds and then removed. This procedure was repeated five times. When the flame expired within 60 seconds, surgical cotton laid on a lower portion was not ignited by flaming drops, and a strip of kraft paper attached to an upper portion of the sample did not burn or scorch, the sample was determined to have an acceptable flame retardancy level and evaluated as "OK". In the case where at least one of the five samples did not reach the acceptable level, the samples were determined to have an unacceptable flame retardancy level and evaluated as "NG".

[Polyolefin-Based Resin]

The types of polyolefin-based resins used in Examples below are shown in Table I.

TABLE I

| No. | Trade name | Manufacturer | Type of polyolefin-based resin |
|---|---|---|---|
| 1 | REXPEARL A1150 | Japan Polyethylene Corporation | EEA (EA content: 15%) |
| 2 | REXPEARL A4250 | Japan Polyethylene Corporation | EEA (EA content: 25%) |
| 3 | NUC-6940 | Nippon Unicar Company Limited | EEA (EA content: 35%) |
| 4 | ENGAGE 8150 | Dow Chemical Japan Ltd. | Very low-density polyethylene |
| 5 | ENGAGE 7270 | Dow Chemical Japan Ltd. | Very low-density polyethylene |
| 6 | ENGAGE HM 7387 | Dow Chemical Japan Ltd. | Very low-density polyethylene |
| 7 | ENGAGE HM 7487 | Dow Chemical Japan Ltd. | Very low-density polyethylene |
| 8 | Evaflex EV550 | Du pont-Mitsui Polychemicals Co., Ltd. | EVA (VA content: 14%) |
| 9 | Evaflex EV360 | Du pont-Mitsui Polychemicals Co., Ltd. | EVA (VA content: 25%) |

[Styrene-Based Elastomer]

Styrene-based elastomers used in Examples below are shown in Table II.

TABLE II

| No. | Trade name | Manufacturer | Type of styrene-based elastomer |
|---|---|---|---|
| 1 | SEPTON 4044 | Kuraray Co., Ltd. | SEEPS (styrene content: 32%) |
| 2 | SEPTON 4055 | Kuraray Co., Ltd. | SEEPS (styrene content: 30%) |
| 3 | SEPTON KL-J3341 | Kuraray Co., Ltd. | SEEPS (styrene content: 40%) |
| 4 | SEPTON 2006 | Kuraray Co., Ltd. | SEPS (styrene content: 35%) |
| 5 | SEPTON KL-7135 | Kuraray Co., Ltd. | SEPS containing vinyl group (styrene content: 30%) |
| 6 | DYNARON 4600P | JSR Corporation | SEBC (styrene content: 20%) |
| 7 | Tuftec H1041 | Asahi Kasei Chemicals Corporation | SEBS (styrene content: 30%) |

[Preparation of Flame-Retardant Resin Compositions and Production of Insulated Electric Wires]

Insulated Electric Wire Nos. 1 to 10:

Mixtures prepared by mixing the polyolefin-based resin 1 (ethylene-ethyl acrylate copolymer, ethylene content: 85% by mass, ethyl acrylate content: 15% by mass), the styrene-based elastomer 1 (SEEPS having a styrene content of 32% by mass), and polyphenylene ether (PPE) in the amounts shown in Table III were used as base polymers. Flame retardants shown in Table III were blended relative to 100 parts by mass of the base polymer, and antioxidants, a cross-linking agent, and other additives were further added to the mixture in the amounts shown in Table III. The resulting mixture was kneaded with a twin-screw mixer including a die whose temperature was set to 280° C. Strands of the kneaded product thus obtained were pelletized with a pelletizer to prepare resin pellets of resin composition Nos. 1 to 10.

A coating layer was formed on a conductor (copper wire having a diameter $\phi$ of 0.76 mm) by extrusion using the prepared pellets of each of the resin composition Nos. 1 to 10 with a melt extruder (diameter $\phi$: 45 mm, L/D=24, compression ratio: 2.5, full-flight type) so as to have a coating thickness of 0.45 mm. The evaluation tests before cross-linking (secant modulus and tensile properties) were conducted using the coating layer of the resulting electric wire.

Next, the coating layer was irradiated with 120 kGy of an electron beam at an accelerating voltage of 2.0 MeV. Thus, a cross-linked coating of each of the resin compositions was prepared. The evaluation tests after cross-linking (the initial state, the 125° C. rating, the 150° C. rating, and the flame retardancy) were conducted using the cross-linked coating. The results are shown in Table III together with the evaluation results before cross-linking.

The compounds described in Table III are as follows.

[Flame Retardants]

Melamine cyanurate: "MC6000" manufactured by Nissan Chemical Industries, Ltd.

Aluminum hypophosphite: "Exolit OP930" manufactured by Clariant Japan K.K.

[Cross-Linking Agent]

Trimethylolpropane trimethacrylate (TMPTMA): TD 1500s manufactured by DIC Corporation

[Other Additives]

Copper inhibitor: "ADK STAB CDA-1" manufactured by Adeka Corporation

Lubricant: Stearic acid SAKURA, manufactured by NOF Corporation

TABLE III

| | | | No. | | | | | | | | | |
|---|---|---|---|---|---|---|---|---|---|---|---|---|
| | | | 1 | 2 | 3 | 4 | 5 | 6 | 7 | 8 | 9 | 10 |
| Composition | Base polymer | EEA | 70 | 70 | 70 | 70 | 70 | 70 | 40 | 50 | 60 | 70 |
| | | SEEPS | 30 | 30 | 30 | 30 | 30 | 30 | 30 | 20 | 20 | 30 |
| | | PPE | — | — | — | — | — | — | 30 | 30 | 20 | — |
| | Flame retardant | Melamine cyanurate | 20 | 20 | 20 | 40 | 40 | 20 | 20 | 20 | 20 | — |
| | | Aluminum hypophosphite | 40 | — | — | — | — | — | 40 | 40 | 40 | — |
| | | Melamine polyphosphate | — | 40 | — | — | — | — | — | — | — | — |
| | | Polyphosphazene | — | — | 40 | — | — | — | — | — | — | — |
| | | Condensed phosphoric acid ester | — | — | — | 40 | — | — | — | — | — | — |
| | | Intumescent flame retardant 1 | — | — | — | — | 40 | — | — | — | — | — |
| | | Intumescent flame retardant 2 | — | — | — | — | — | 40 | — | — | — | — |
| | | Mg(OH)$_2$ | — | — | — | — | — | — | — | — | — | 200 |
| | Antioxidant | Hindered | 4 | 4 | 4 | 4 | 4 | 4 | 4 | 4 | 4 | 4 |
| | | Sulfur | 1 | 1 | 1 | 1 | 1 | 1 | 1 | 1 | 1 | 1 |
| | Cross-linking agent | TMPTMA | 3 | 3 | 3 | 3 | 3 | 3 | 3 | 3 | 3 | 3 |
| | Others | Copper inhibitor | 1 | — | — | — | — | — | — | — | — | — |
| | | Lubricant | 1.5 | 1.5 | 1.5 | 1.5 | 1.5 | 1.5 | 1.5 | 1.5 | 1.5 | 1.5 |
| Evaluation | Unirradiation | Secant modulus (MPa) | 60.0 | 22.6 | 19.8 | 21.6 | 20.2 | 23.2 | 39.5 | 43.1 | 30.5 | 29.5 |
| | | Tensile strength (MPa) | 10.8 | 10.9 | 11.3 | 11.2 | 11.0 | 10.7 | 11.9 | 12.1 | 11.5 | 10.2 |
| | | Elongation (%) | 510 | 530 | 510 | 460 | 480 | 470 | 350 | 330 | 410 | 260 |
| | After irradiation | Initial state Modulus (MPa) | 64.5 | 24.6 | 23.5 | 23.6 | 22.3 | 24.1 | 50.0 | 46.8 | 36.5 | 35.1 |
| | | Tensile strength (MPa) | 14.2 | 13.9 | 14.1 | 14.6 | 14.5 | 14.3 | 13.8 | 14.1 | 13.9 | 12.5 |
| | | Elongation (%) | 450 | 340 | 320 | 360 | 330 | 310 | 269 | 310 | 340 | 230 |
| | | After 125° C. rating test Tensile strength | 13.9 | 14.4 | 14.1 | 14.3 | 13.9 | 14.6 | 13.2 | 12.5 | 12.1 | 11.3 |
| | | Retention (%) | (97) | (104) | (100) | (98) | (96) | (102) | (96) | (89) | (87) | (90) |
| | | Elongation | 390 | 323 | 315 | 330 | 319 | 295 | 220 | 250 | 290 | 127 |
| | | Retention (%) | (87) | (95) | (98) | (92) | (97) | (95) | (82) | (81) | (85) | (55) |
| | | After 150° C. rating test Tensile strength | 14.0 | 14.1 | 13.9 | 14.0 | 13.7 | 13.9 | 12.2 | 11.6 | 10.1 | 10.0 |
| | | Retention (%) | (99) | (101) | (99) | (96) | (94) | (97) | (88) | (82) | (73) | (80) |
| | | Elongation | 370 | 310 | 310 | 310 | 295 | 280 | 143 | 134 | 190 | 80 |
| | | Retention (%) | (82) | (91) | (97) | (86) | (89) | (90) | (53) | (43) | (56) | (35) |
| | | Flame retardancy | OK | NG | NG | NG | NG | NG | OK | OK | OK | OK |

Melamine polyphosphate: "Melapur 200" manufactured by BASF Japan Ltd.

Polyphosphazene: "SPS-100" manufactured by Otsuka Chemical Co., Ltd.

Condensed phosphoric acid ester: "PX-200" manufactured by Daihachi Chemical Industry Co., Ltd.

Intumescent flame retardant 1: "ADK STAB FP-2100J" (registered trademark) manufactured by Adeka Corporation (This is an intumescent flame retardant containing phosphorus and a nitrogen-containing compound)

Intumescent flame retardant 2: "ADK STAB FP-2200" (registered trademark) manufactured by Adeka Corporation (This is an intumescent flame retardant containing phosphorus and a nitrogen-containing compound)

Magnesium hydroxide: "KISUMA 5SDK" (registered trademark) manufactured by Kyowa Chemical Industry Co., Ltd. (This is subjected to a surface treatment with aminosilane.)

[Antioxidants]

Hindered phenol-based antioxidant: "IRGANOX 1010" (registered trademark) manufactured by BASF Japan Ltd.

Sulfur-based antioxidant: "SEENOX 412s" manufactured by Shipro Kasei Kaisha, Ltd.

In Nos. 1 to 6, a mixture of a polyolefin-based resin (EEA) and a styrene-based elastomer (SEEPS) was used as a base polymer. In No. 1, in which aluminum hypophosphite being a metal phosphinate is used as a phosphorus-based flame retardant, the flame retardancy and heat-aging resistance of the 150° C. rating could be satisfied. In contrast, in Nos. 2 to 6, in which other phosphorus-based flame retardants were used, although heat-aging resistance of the 150° C. rating could be satisfied, the flame retardancy was unacceptable.

In Nos. 7 to 9, a mixture prepared by mixing a polyolefin-based resin (EEA) and a styrene-based elastomer (SEEPS), and further adding polyphenylene ether was used as a base polymer. Although the flame retardancy was acceptable, the elongation was decreased by the addition of polyphenylene ether and heat-aging resistance of the 150° C. rating could not be satisfied.

In No. 10, an existing metal hydroxide was used as a flame retardant. Although the flame retardant test was passed by adding the metal hydroxide in a larger amount, namely, in an amount two times the amount of the base polymer, the elongation was decreased by the addition of the metal hydroxide in the larger amount. Thus, heat-aging resistance of the 125° C. rating and the 150° C. rating could not be satisfied.

Insulated Electric Wire Nos. 11 to 18:

Resin composition Nos. 11 to 18 including base polymers containing different types of polyolefin-based resins were prepared by using the styrene-based elastomer 1 (SEEPS having a styrene content of 32% by mass) as a styrene-based elastomer, and polyolefin-based resin Nos. 1 to 9 shown in Table I as a polyolefin-based resin. Insulated electric wires were prepared as in No. 1, and the evaluation tests before cross-linking (secant modulus and tensile properties) were conducted. The coating layer was cross-linked by irradiation with ionizing radiation as in No. 1. The evaluation tests after cross-linking (the initial state, the 125° C. rating, the 150° C. rating, and the flame retardancy) were conducted using the cross-linked coating composed of each of the resin compositions. The results are shown in Table IV. In Table IV, the numerical values in the parentheses in the column of polyolefin-based resin each represent the content of EA or VA.

ethylene content of 50% by mass or more and a styrene-based elastomer (SEEPS), the 150° C. rating and the flame retardancy could be satisfied after irradiation.

Insulated Electric Wire Nos. 21 to 26

Resin composition Nos. 21 to 26 including base polymers containing different types of styrene-based elastomers were prepared by using the polyolefin-based resin 1 (ethylene-ethyl acrylate copolymer, ethylene content: 85% by mass, ethyl acrylate content: 15% by mass) as a polyolefin-based resin (PO-based resin) and the styrene-based elastomer Nos. 1 to 7 shown in Table II as a styrene-based elastomer. Insulated electric wires were prepared as in No. 1, and the evaluation tests before cross-linking (secant modulus and tensile properties) were conducted. The coating layer was cross-linked by irradiation with ionizing radiation as in No. 1. The evaluation tests after cross-linking (the initial state, the 125° C. rating, the 150° C. rating, and the flame retardancy) were conducted using the cross-linked coating. The results are

TABLE IV

| | | | | | No. | | | | | | | |
|---|---|---|---|---|---|---|---|---|---|---|---|---|
| | | | | 1 | 11 | 12 | 13 | 14 | 15 | 16 | 17 | 18 |
| Composition | Polyolefin-based resin | 1 | EEA (15) | 70 | — | — | — | — | — | — | — | — |
| | | 2 | EEA (25) | — | 70 | — | — | — | — | — | — | — |
| | | 3 | EEA (35) | — | — | 70 | — | — | — | — | — | — |
| | | 4 | PE | — | — | — | 70 | — | — | — | — | — |
| | | 5 | PE | — | — | — | — | 70 | — | — | — | — |
| | | 6 | PE | — | — | — | — | — | 70 | — | — | — |
| | | 7 | PE | — | — | — | — | — | — | 70 | — | — |
| | | 8 | EVA (14) | — | — | — | — | — | — | — | 70 | — |
| | | 9 | EVA (25) | — | — | — | — | — | — | — | — | 70 |
| | Styrene elastomer | 1 | SEEPS | 30 | 30 | 30 | 30 | 30 | 30 | 30 | 30 | 30 |
| | Flame retardant | | Melamine cyanurate | 20 | 20 | 20 | 20 | 20 | 40 | 40 | 20 | 20 |
| | | | Aluminum hypophosphite | 40 | 40 | 40 | 40 | 40 | 40 | 40 | 40 | 40 |
| | Antioxidant | | Hindered-based | 4 | 4 | 4 | 4 | 4 | 4 | 4 | 4 | 4 |
| | | | Sulfur-based | 1 | 1 | 1 | 1 | 1 | 1 | 1 | 1 | 1 |
| | TMPTMA | | | 3 | 3 | 3 | 3 | 3 | 3 | 3 | 3 | 3 |
| | Others | | Copper inhibitor | 1 | 1 | 1 | 1 | 1 | 1 | 1 | 1 | 1 |
| | | | Lubricant | 1.5 | 1.5 | 1.5 | 1.5 | 1.5 | 1.5 | 1.5 | 1.5 | 1.5 |
| Evaluation | Unirradiation | | Secant modulus (MPa) | 60.0 | 58.0 | 48.0 | 22.3 | 26.1 | 23.9 | 25.0 | 41.2 | 36.0 |
| | | | Tensile strength (MPa) | 10.8 | 10.3 | 9.8 | 10.3 | 11.0 | 12.3 | 11.0 | 10.6 | 9.9 |
| | | | Elongation (%) | 510 | 600 | 580 | 560 | 590 | 480 | 490 | 420 | 390 |
| | After irradiation | Initial state | Modulus (MPa) | 64.5 | 64.5 | 55.3 | 24.5 | 78.8 | 66.9 | 79.2 | 78.8 | 63.5 |
| | | | Tensile strength (MPa) | 14.2 | 14.0 | 14.2 | 15.9 | 16.1 | 14.5 | 14.3 | 16.1 | 15.3 |
| | | | Elongation (%) | 450 | 390 | 380 | 450 | 460 | 390 | 380 | 410 | 360 |
| | | After 125° C. rating test | Tensile strength | 13.9 | 14.1 | 14.5 | 15.3 | 15.6 | 14.6 | 14.1 | 15.3 | 14.8 |
| | | | Retention (%) | (97) | (101) | (102) | (96) | (97) | (101) | (99) | (95) | (97) |
| | | | Elongation | 390 | 370 | 360 | 420 | 430 | 370 | 360 | 390 | 340 |
| | | | Retention (%) | (87) | (95) | (95) | (93) | (93) | (95) | (95) | (95) | (94) |
| | | After 150° C. rating test | Tensile strength | 14.0 | 13.7 | 14.1 | 14.8 | 15.1 | 14.3 | 13.9 | 14.2 | 14.6 |
| | | | Retention (%) | (99) | (98) | (99) | (93) | (94) | (99) | (97) | (88) | (95) |
| | | | Elongation | 370 | 360 | 340 | 390 | 410 | 350 | 350 | 360 | 320 |
| | | | Retention (%) | (82) | (92) | (98) | (87) | (89) | (90) | (92) | (88) | (89) |
| | | | Flame retardancy | OK | OK | OK | OK | OK | OK | OK | OK | OK |

Referring to Table IV, in insulated electric wire No. 1 and Nos. 11 to 18 containing, as a base polymer, a mixture of one of the polyolefin-based resin Nos. 1 to 9 each having an shown in Table V. In Table V, the numerical values in the parentheses in the column of styrene-based elastomer each represent the styrene content.

TABLE V

| | | | | No. | | | | | | |
|---|---|---|---|---|---|---|---|---|---|---|
| | | | | 1 | 21 | 22 | 23 | 24 | 25 | 26 |
| Composition | PO-based | 1 | EEA | 70 | 70 | 70 | 70 | 70 | 70 | 70 |
| | Styrene elastomer | 1 | SEEPS (32) | 30 | — | — | — | — | — | — |
| | | 2 | SEEPS (30) | — | 30 | — | — | — | — | — |
| | | 3 | SEEPS (40) | — | — | 30 | — | — | — | — |
| | | 4 | SEPS (35) | — | — | — | 30 | — | — | — |

TABLE V-continued

| | | | | | No. 1 | No. 21 | No. 22 | No. 23 | No. 24 | No. 25 | No. 26 |
|---|---|---|---|---|---|---|---|---|---|---|---|
| | | 5 | SEPS (30) | | — | — | — | — | 30 | — | — |
| | | 6 | SEBC (20) | | — | — | — | — | — | 30 | — |
| | | 7 | SEBS (30) | | — | — | — | — | — | — | 30 |
| | Flame retardant | Melamine cyanurate | | | 20 | 20 | 20 | 40 | 40 | 20 | 20 |
| | | Aluminum hypophosphite | | | 40 | 40 | 40 | 40 | 40 | 40 | 40 |
| | Antioxidant | Hindered-based | | | 4 | 4 | 4 | 4 | 4 | 4 | 4 |
| | | Sulfur-based | | | 1 | 1 | 1 | 1 | 1 | 1 | 1 |
| | TMPTMA | | | | 3 | 3 | 3 | 3 | 3 | 3 | 3 |
| | Others | Copper inhibitor | | | 1 | 1 | 1 | 1 | 1 | 1 | 1 |
| | | Lubricant | | | 1.5 | 1.5 | 1.5 | 1.5 | 1.5 | 1.5 | 1.5 |
| Evaluation | Unirradiation | Secant modulus (MPa) | | | 60.0 | 63.5 | 65.8 | 62.0 | 63.5 | 54.3 | 55.0 |
| | | Tensile strength (MPa) | | | 10.8 | 10.9 | 10.5 | 11.6 | 10.9 | 11.5 | 11.5 |
| | | Elongation (%) | | | 510 | 420 | 450 | 410 | 410 | 500 | 510 |
| | After irradiation | Initial state | Modulus (MPa) | | 64.5 | 78.8 | 66.9 | 79.2 | 78.8 | 63.5 | 71.2 |
| | | | Tensile strength (MPa) | | 14.2 | 13.9 | 14.1 | 14.3 | 15.3 | 14.5 | 16.2 |
| | | | Elongation (%) | | 450 | 390 | 420 | 380 | 390 | 430 | 450 |
| | | After 125° C. rating test | Tensile strength Retention (%) | | 13.9 (97) | 13.6 (98) | 12.7 (90) | 13.5 (94) | 12.3 (84) | 14.4 (99) | 15.9 (98) |
| | | | Elongation Retention (%) | | 390 (87) | 420 (108) | 390 (93) | 420 (111) | 410 (105) | 420 (98) | 440 (98) |
| | | After 150° C. rating test | Tensile strength Retention (%) | | 14.0 (99) | 12.9 (93) | 11.7 (83) | 12.9 (90) | 12.4 (81) | 14.1 (97) | 15.3 (94) |
| | | | Elongation Retention (%) | | 370 (82) | 330 (85) | 340 (81) | 370 (97) | 340 (88) | 390 (91) | 395 (88) |
| | Flame retardancy | | | | OK | OK | OK | OK | OK | OK | OK |

Referring to Table V, in insulated electric wire No. 1 and Nos. 21 to 26 containing, as a base polymer, a mixture of a styrene-based elastomer having a styrene content of 10% to 70% by mass and a polyolefin-based resin, the 150° C. rating and the flame retardancy could be satisfied after irradiation.

Insulated Electric Wire Nos. 31 to 36

Resin composition Nos. 31 to 36 including base polymers having different mixing ratios of a polyolefin-based resin to a styrene-based elastomer were prepared by blending the polyolefin-based resin No. 1, 2, or 3 shown in Table I as a polyolefin-based resin (PO-based resin) with the styrene-based elastomer No. 1 or 7 shown in Table II as a styrene-based elastomer in the mixing ratios shown in Table VI. Insulated electric wires were prepared as in No. 1, and the evaluation tests before cross-linking (secant modulus and tensile properties) were conducted. The coating layer was cross-linked by irradiation with ionizing radiation as in No. 1. The evaluation tests after cross-linking (the initial state, the 125° C. rating, the 150° C. rating, and the flame retardancy) were conducted using the cross-linked coating. The results are shown in Table VI.

TABLE VI

| | | | | | No. 1 | No. 31 | No. 32 | No. 33 | No. 34 | No. 35 | No. 36 |
|---|---|---|---|---|---|---|---|---|---|---|---|
| Composition | PO-based resin | 1 | EEA (15% EA) | | 70 | — | — | — | — | — | — |
| | | 2 | EEA (25% EA) | | — | 95 | 100 | 100 | 100 | — | 60 |
| | | 3 | EEA (35% EA) | | — | — | — | — | — | 100 | — |
| | St elastomer | 1 | SEEPS (32% St) | | 30 | 5 | — | — | — | — | 10 |
| | | 7 | SEBS (30% St) | | — | — | — | — | — | — | 30 |
| | Flame retardant | Melamine cyanurate | | | 20 | 20 | 20 | 5 | 30 | 10 | 20 |
| | | Aluminum hypophosphite | | | 40 | 40 | 40 | 50 | 10 | 10 | 40 |
| | Antioxidant | Hindered-based | | | 4 | 4 | 4 | 4 | 4 | 4 | 4 |
| | | Sulfur-based | | | 1 | 1 | 1 | 1 | 1 | 1 | 1 |
| | Cross-linking | TMPTMA | | | 3 | 3 | 3 | 3 | 3 | 3 | 3 |
| | Others | Copper inhibitor | | | 1 | 1 | 1 | 1 | 1 | 1 | 1 |
| | | Lubricant | | | 1.5 | 1.5 | 1.5 | 1.5 | 1.5 | 1.5 | 1.5 |
| Evaluation | Unirradiation | Secant modulus (MPa) | | | 60.0 | 72.5 | 71.5 | 69.4 | 73.5 | 53.5 | 60.0 |
| | | Tensile strength (MPa) | | | 10.8 | 10.5 | 10.9 | 10.4 | 11.2 | 10.5 | 11.0 |
| | | Elongation (%) | | | 510 | 490 | 520 | 550 | 510 | 600 | 580 |
| | After irradiation | Initial state | Secant modulus (MPa) | | 64.5 | 75.0 | 73.8 | 72.0 | 82.5 | 59.5 | 71.3 |
| | | | Tensile strength (MPa) | | 14.2 | 14.0 | 14.3 | 15.2 | 16.3 | 14.9 | 14.3 |
| | | | Elongation (%) | | 450 | 460 | 490 | 510 | 370 | 480 | 380 |
| | | After 125° C. rating test | Tensile strength Retention (%) | | 13.9 (98) | 14.1 (101) | 14.2 (99) | 14.9 (98) | 15.9 (98) | 14.9 (100) | 14.2 (99) |
| | | | Elongation Retention (%) | | 390 (87) | 430 (93) | 468 (96) | 490 (96) | 330 (89) | 480 (100) | 340 (89) |
| | | After 150° C. rating test | Tensile strength Retention (%) | | 14.0 (99) | 13.2 (94) | 13.8 (97) | 13.9 (91) | 13.8 (85) | 12.9 (87) | 13.9 (97) |
| | | | Elongation Retention (%) | | 370 (82) | 390 (85) | 415 (85) | 460 (90) | 300 (81) | 428 (89) | 335 (88) |
| | Flame retardancy | | | | OK | OK | OK | OK | OK | OK | OK |

It is found that the resin composition No. 31 in which a base polymer having a polyolefin-based resin content of 95% by mass is used, the resin composition Nos. 32 to 35 in which a base polymer having a polyolefin-based resin content of 100% by mass is used, and the resin composition No. 36 in which the polyolefin-based resin content is 60% by mass satisfy the 150° C. rating and the flame retardancy after irradiation.

[Preparation and Evaluation of Heat-Shrinkable Tubes]
Tube Nos. 41 to 46:

A mixture prepared by mixing the polyolefin-based resin (PO-based resin) No. 1 shown in Table I with the styrene-based elastomer No. 1, 3, 4, or 6 shown in Table II in the amounts shown in Table VII was used as a base polymer. Flame retardants shown in Table VII were blended relative to 100 parts by mass of the base polymer, and antioxidants, a multifunctional monomer (TMPTMA), and other additives were further added to the mixture in the amounts shown in Table VII. The resulting mixture was mixed at a temperature of 140° C. to 200° C. with an open roll, a kneading machine, or a Banbury mixer. Strands of the kneaded product thus obtained were pelletized with a pelletizer to prepare resin pellets of resin composition Nos. 41 to 46.

A tube-shaped molded body having an inner diameter of 0.80 mm and a thickness of 0.25 mm or an inner diameter of 5.00 mm and a thickness of 0.30 mm was formed by extrusion molding using the prepared pellets of each of the resin composition Nos. 41 to 46 with a melt extruder (diameter φ: 45 mm, L/D=24, compression ratio: 2.5, full-flight type). The prepared tube was irradiated with 120 kGy of an electron beam at an accelerating voltage of 2.0 MeV. Subsequently, heat-shrinkable tube Nos. 41 to 46 were prepared by wet expansion in which the diameter of a tube was expanded by heating using heated polyethylene glycol or the like as a heating medium. The measurement for the evaluation of the initial state, the 125° C. rating, the 150° C. rating, and the flame retardancy was conducted using the prepared heat-shrinkable tubes in accordance with UL 224 and the evaluation tests after cross-linking of the insulated electric wires. The results are shown in Table VII. In Table VII, the numerical values in the parentheses in the column of styrene-based elastomer each represent the styrene content.

TABLE VII

| | | | | No. 41 | No. 42 | No. 43 | No. 44 | No. 45 | No. 46 |
|---|---|---|---|---|---|---|---|---|---|
| Composition | PO-based resin | 1 | EEA | 70 | 100 | 70 | 70 | 100 | 70 |
| | Styrene elastomer | 1 | SEEPS (32) | 30 | — | — | — | — | — |
| | | 3 | SEEPS (40) | — | — | 30 | — | — | — |
| | | 4 | SEPS (35) | — | — | — | 30 | — | — |
| | | 6 | SEBC (20) | — | — | — | — | — | 30 |
| | Flame retardant | | Melamine cyanurate | 20 | 20 | 20 | 40 | 40 | 20 |
| | | | Aluminum hypophosphite | 40 | 40 | 40 | 40 | 40 | 40 |
| | Antioxidant | | Hindered-based | 4 | 4 | 4 | 4 | 4 | 4 |
| | | | Sulfur-based | 1 | 1 | 1 | 1 | 1 | 1 |
| | Cross-linking agent | | TMPTMA | 3 | 3 | 3 | 3 | 3 | 3 |
| | Others | | Benzimidazole | 3 | 3 | 3 | 3 | 3 | 3 |
| | | | Zinc oxide | 3 | 3 | 3 | 3 | 3 | 3 |
| | | | Lubricant | 1.5 | 1.5 | 1.5 | 1.5 | 1.5 | 1.5 |
| Evaluation (After irradiation) | Initial state | | Modulus (MPa) | 62.5 | 60.3 | 72.5 | 64.0 | 62.3 | 65.9 |
| | | | Tensile strength (MPa) | 13.6 | 12.5 | 12.3 | 15.4 | 13.1 | 11.3 |
| | | | Elongation (%) | 360 | 268 | 290 | 390 | 310 | 320 |
| | After 125° C. rating test | | Tensile strength (MPa) | 11.9 | 11.3 | 10.6 | 12.8 | 10.9 | 10.3 |
| | | | Elongation (%) | 330 | 225 | 260 | 360 | 250 | 260 |
| | After 150° C. rating test | | Tensile strength (MPa) | 10.9 | 10.5 | 10.3 | 11.5 | 10.3 | 10.1 |
| | | | Elongation (%) | 290 | 195 | 230 | 290 | 230 | 210 |
| | | | Flame retardancy | OK | OK | OK | OK | OK | OK |

Each of the tubes could pass the Vertical-Specimen-Flame test VW-1, satisfy an initial tensile strength of 10.4 MPa or more and an initial elongation of 200% or more, and satisfy a tensile strength of 7.3 MPa or more and an elongation of 100% or more after the heat-aging resistance test of the 150° C. rating.

INDUSTRIAL APPLICABILITY

The non-halogen flame-retardant resin composition of the present invention can pass the Vertical-Specimen-Flame test VW-1 and satisfy the tensile properties specified in the 150° C. rating after cross-linking. Accordingly, in the field of electric wires such as internal wiring of electronic equipment, office automation (OA) equipment, various types of household electronic equipment such as audio equipment and a digital versatile disc (DVD) player, vehicles, and vessels, and heat-shrinkable tubes that protect electric wires or the like, the non-halogen insulated electric wire and heat-shrinkable tube of the present invention can be used instead of insulated electric wires and heat-shrinkable tubes in which a halogen-based flame retardant is used in order to satisfy the requirements of the 150° C. rating specified in UL standards.

The invention claimed is:
1. A non-halogen flame-retardant resin composition comprising:
   (A) a base polymer containing 90% by mass or more of a mixture of a polyolefin-based resin and a styrene-based elastomer, the polyolefin-based resin being at least one selected from the group consisting of ethylene-ethyl acrylate copolymers, ethylene-methyl acrylate copolymers, ethylene-vinyl acetate copolymers, ethylene-butene copolymers, ethylene-octene copolymers, and very low-density polyethylenes, the polyolefin-based resin having an ethylene content of 50% by mass or more;

(B) a metal phosphinate; and
(C) a nitrogen-based flame retardant, and wherein
the non-halogen flame-retardant resin composition contains no metal hydroxides.

2. The non-halogen flame-retardant resin composition according to claim 1, wherein a mass ratio of the content of the polyolefin-based resin to the content of the styrene-based elastomer (polyolefin-based resin:styrene-based elastomer) is 90:10 to 50:50.

3. The non-halogen flame-retardant resin composition according to claim 1, wherein 10 to 50 parts by mass of the metal phosphinate and 10 to 50 parts by mass of the nitrogen-based flame retardant are contained relative to 100 parts by mass of the base polymer.

4. The non-halogen flame-retardant resin composition according to claim 1, wherein the styrene-based elastomer is a block copolymer of styrene and a rubber component, and the content of the styrene component is 10% to 70% by mass.

5. The non-halogen flame-retardant resin composition according to claim 1, wherein the metal phosphinate is aluminum hypophosphite.

6. The non-halogen flame-retardant resin composition according to claim 1, wherein the nitrogen-based flame retardant is melamine cyanurate.

7. The non-halogen flame-retardant resin composition according to claim 1, further comprising a multifunctional monomer.

8. An insulated electric wire comprising a conductor and a coating layer that covers the conductor, wherein the coating layer is composed of the non-halogen flame-retardant resin composition according to claim 1.

9. The insulated electric wire according to claim 8, wherein the coating layer is cross-linked by irradiation with ionizing radiation.

10. The insulated electric wire according to claim 8, wherein the conductor has an outer diameter of 0.1 mm or more and 0.8 mm or less, and the coating layer has a thickness of 0.1 mm or more and 1 mm or less.

11. A tube produced by forming the non-halogen flame-retardant resin composition according to claim 1 into a tube.

12. A heat-shrinkable tube produced by cross-linking the tube according to claim 11 by irradiation with ionizing radiation, increasing the diameter of the tube under heating, and subsequently conducting cooling to fix the shape of the tube.

13. An insulated electric wire comprising a conductor and a coating layer that covers the conductor, wherein the coating layer is formed by cross-linking a non-halogen flame-retardant resin composition by irradiation with ionizing radiation, the non-halogen flame-retardant resin composition containing a base polymer containing 50% by mass or more of a polyolefin-based resin, a metal phosphinate, and a nitrogen-based flame retardant, the polyolefin-based resin being at least one selected from the group consisting of ethylene-ethyl acrylate copolymers, ethylene-methyl acrylate copolymers, ethylene-vinyl acetate copolymers, ethylene-butene copolymers, ethylene-octene copolymers, and very low-density polyethylenes, the polyolefin-based resin having an ethylene content of 50% by mass or more, the non-halogen flame-retardant resin composition containing no metal hydroxides, and the coating layer has an initial tensile strength of 13.8 MPa or more, an initial tensile elongation of 300% or more, a retention of each of the tensile strength and the tensile elongation of 80% or more after being heat-aged at 180° C. for seven days, and passes a Vertical-Specimen-Flame test (VW-1) specified in UL standards.

* * * * *